United States Patent
Kikawa et al.

(10) Patent No.: US 9,463,782 B2
(45) Date of Patent: Oct. 11, 2016

(54) BRAKE CONTROL SYSTEM

(71) Applicant: HITACHI AUTOMOTIVE SYSTEMS, LTD., Ibaraki (JP)

(72) Inventors: Masayuki Kikawa, Kanagawa (JP); Shuji Ohshita, Atsugi (JP); Norikazu Matsuzaki, Atsugi (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 14/605,116

(22) Filed: Jan. 26, 2015

(65) Prior Publication Data

US 2015/0217741 A1 Aug. 6, 2015

(30) Foreign Application Priority Data

Jan. 31, 2014 (JP) .................. 2014-017779

(51) Int. Cl.
| | |
|---|---|
| *B60T 8/1761* | (2006.01) |
| *B60L 7/18* | (2006.01) |
| *B60T 1/10* | (2006.01) |
| *B60T 13/14* | (2006.01) |
| *B60T 13/66* | (2006.01) |

(Continued)

(52) U.S. Cl.
CPC .............. *B60T 8/1761* (2013.01); *B60L 7/18* (2013.01); *B60T 1/10* (2013.01); *B60T 8/17616* (2013.01); *B60T 13/146* (2013.01); *B60T 13/662* (2013.01); *B60T 13/686* (2013.01); *B60T 13/745* (2013.01); *B60T 8/321* (2013.01); *B60T 8/4872* (2013.01); *B60T 2270/602* (2013.01); *Y02T 10/7258* (2013.01)

(58) Field of Classification Search
CPC .... B60L 7/18; B60T 8/1761; B60T 8/17616; B60T 8/321; B60T 8/4872; B60T 2270/602; B60T 1/10; B60T 13/745; B60T 13/146; B60T 13/662; B60T 13/686; Y02T 10/7258
USPC ............................................ 701/71
See application file for complete search history.

(56) References Cited

U.S. PATENT DOCUMENTS 4,671,577 A * 6/1987 Woods ................ B60L 3/108
180/165
5,450,324 A * 9/1995 Cikanek ............... B60L 3/102
303/20

(Continued)

FOREIGN PATENT DOCUMENTS

JP 2012-95391 5/2012

*Primary Examiner* — Atul Trivedi
(74) *Attorney, Agent, or Firm* — Wenderoth, Lind & Ponack, L.L.P.

(57) ABSTRACT

A brake control system which can maintain the behavior of a vehicle stable when wheels slip. A slip amount detector (56), configured to detect an amount of slip at the front and rear wheels, is connected to a second ECU (35). A first ECU (27) has a regenerative slip control unit which executes repeatedly a slip restricting control in which, while the front wheels are being detected as slipping based on a detection value of the slip amount detector during the execution of regenerative braking by a motor-generator (55), the amount of regenerative braking by the motor-generator is reduced by a predetermined amount, and thereafter, the resulting reduced amount of regenerative braking is held for a predetermined period of time. The regenerative slip control unit sets the predetermined reduction amount larger than a predetermined reduction amount by which the amount of regenerative braking is reduced in the slip restricting control.

20 Claims, 7 Drawing Sheets

(51) Int. Cl.
   *B60T 13/68*  (2006.01)
   *B60T 13/74*  (2006.01)
   B60T 8/32    (2006.01)
   B60T 8/48    (2006.01)

(56) References Cited

U.S. PATENT DOCUMENTS

| | | | | |
|---|---|---|---|---|
| 5,951,118 | A * | 9/1999 | Soejima | B60T 8/36 303/113.1 |
| 6,033,041 | A * | 3/2000 | Koga | B60L 7/12 188/159 |
| 6,086,166 | A * | 7/2000 | Fukasawa | B60L 3/0023 303/122.04 |
| 8,612,074 | B2 * | 12/2013 | Minarcin | B60W 10/08 701/22 |
| 8,788,144 | B2 * | 7/2014 | Krueger | B60L 3/10 180/65.265 |
| 8,954,249 | B2 * | 2/2015 | Nakatsu | B60L 3/102 701/69 |
| 2002/0180266 | A1 * | 12/2002 | Hara | B60L 7/18 303/152 |
| 2005/0143878 | A1 * | 6/2005 | Park | B60K 6/48 701/22 |
| 2006/0220453 | A1 * | 10/2006 | Saito | B60L 7/26 303/152 |
| 2009/0115246 | A1 * | 5/2009 | Yanagida | B60K 28/16 303/144 |
| 2010/0113215 | A1 * | 5/2010 | Jager | B60L 7/26 477/29 |
| 2011/0074204 | A1 * | 3/2011 | Kim | B60L 7/12 303/3 |
| 2011/0251770 | A1 * | 10/2011 | Minarcin | B60T 1/10 701/71 |
| 2012/0130581 | A1 * | 5/2012 | Semsey | B60T 8/17555 701/22 |
| 2012/0133202 | A1 * | 5/2012 | Mui | B60L 3/10 303/152 |
| 2012/0203416 | A1 * | 8/2012 | Yoshimura | B60K 6/445 701/22 |
| 2012/0325573 | A1 * | 12/2012 | Miller | B60L 7/24 180/282 |
| 2013/0173127 | A1 * | 7/2013 | Nakatsu | B60L 3/102 701/70 |
| 2013/0289809 | A1 * | 10/2013 | Treharne | B60L 1/003 701/22 |
| 2015/0019058 | A1 * | 1/2015 | Georgiev | B60L 7/18 701/22 |
| 2015/0202965 | A1 * | 7/2015 | Gabor | B60L 7/18 701/70 |
| 2015/0274020 | A1 * | 10/2015 | Matsuda | B60L 7/26 701/70 |
| 2015/0321564 | A1 * | 11/2015 | Huh | B60W 10/196 701/22 |
| 2016/0082843 | A1 * | 3/2016 | Semsey | B60L 7/22 701/70 |
| 2016/0096434 | A1 * | 4/2016 | Nakaoka | B60L 3/102 701/78 |

* cited by examiner

BRAKE CONTROL SYSTEM

TECHNICAL FIELD

The present invention relates to a brake control system which is used preferably on a vehicle such as a motor vehicle.

BACKGROUND ART

In a vehicle such as an electric vehicle or a hybrid electric vehicle in which a traction (drive) motor (a motor-generator or a generating motor) is mounted, a distribution between a frictional braking force produced by friction linings and a regenerative braking force produced by the motor is controlled to obtain a total braking force desired for the vehicle (refer to Japanese Patent Application Publication No. 2012-95391, for example).

SUMMARY OF INVENTION

In the related art disclosed in Japanese Patent Application Publication No. 2012-95391 described above, a relative slip ratio is calculated from a vehicle speed and wheel speeds to restrict the extent of regenerative braking according to the slip ratio so obtained. With this configuration, however, in case the increase in regenerative braking amount changes sharply with the slip ratio exceeding a predetermined level, although the regenerative braking amount is restricted, there exists a possibility that the excessive braking conditions continue. As this occurs, there are fears that the behavior of the vehicle becomes unstable.

The invention has been made in view of the problem inherent in the related art, and an object of the invention is to provide a brake control system which can maintain the behavior of a vehicle stable when a slip occurs as a result of intervention of regenerative braking.

With a view to solving the problem, according to an aspect of the invention, there is provided a brake control system driven by an electric motor and configured to brake a vehicle by not only controlling an amount of regenerative braking by the electric motor but also controlling friction braking devices which are provided individually at wheels and which each have a friction, lining which moves upon receipt of a hydraulic pressure, including a slip amount detection, unit configured to detect an amount of slip of each of the wheels which are provided on the vehicle and a regenerative slip control unit configured to execute repeatedly a slip restricting control in which an amount of regenerative braking is reduced by a predetermined amount and thereafter, the resulting reduced amount of generative braking is held for a predetermined period of time while the wheels are being detected as slipping through a detection, value of the slip amount detection unit during a regenerative braking by the electric motor, wherein the slip restricting control unit sets the predetermined reduction amount by which the amount of regenerative braking is reduced when, the wheels are detected as slipping larger than a predetermined reduction, amount by which the amount of regenerative braking is reduced in the slip restricting control which is executed subsequently.

Advantageous Effects of Invention

According to the invention, the behavior of the vehicle cars, be maintained stable when a slip occurs as a result of the intervention, of regenerative braking.

DESCRIPTION OF EMBODIMENTS

Hereinafter, a brake control system according to an embodiment of the invention will be described in detail by reference to the accompanying drawings by taking as an example a case where the brake control system is applied to a four-wheeled vehicle such as an electric vehicle or a hybrid electric vehicle which installs an electric motor (a motor-generator).

Figure 1:
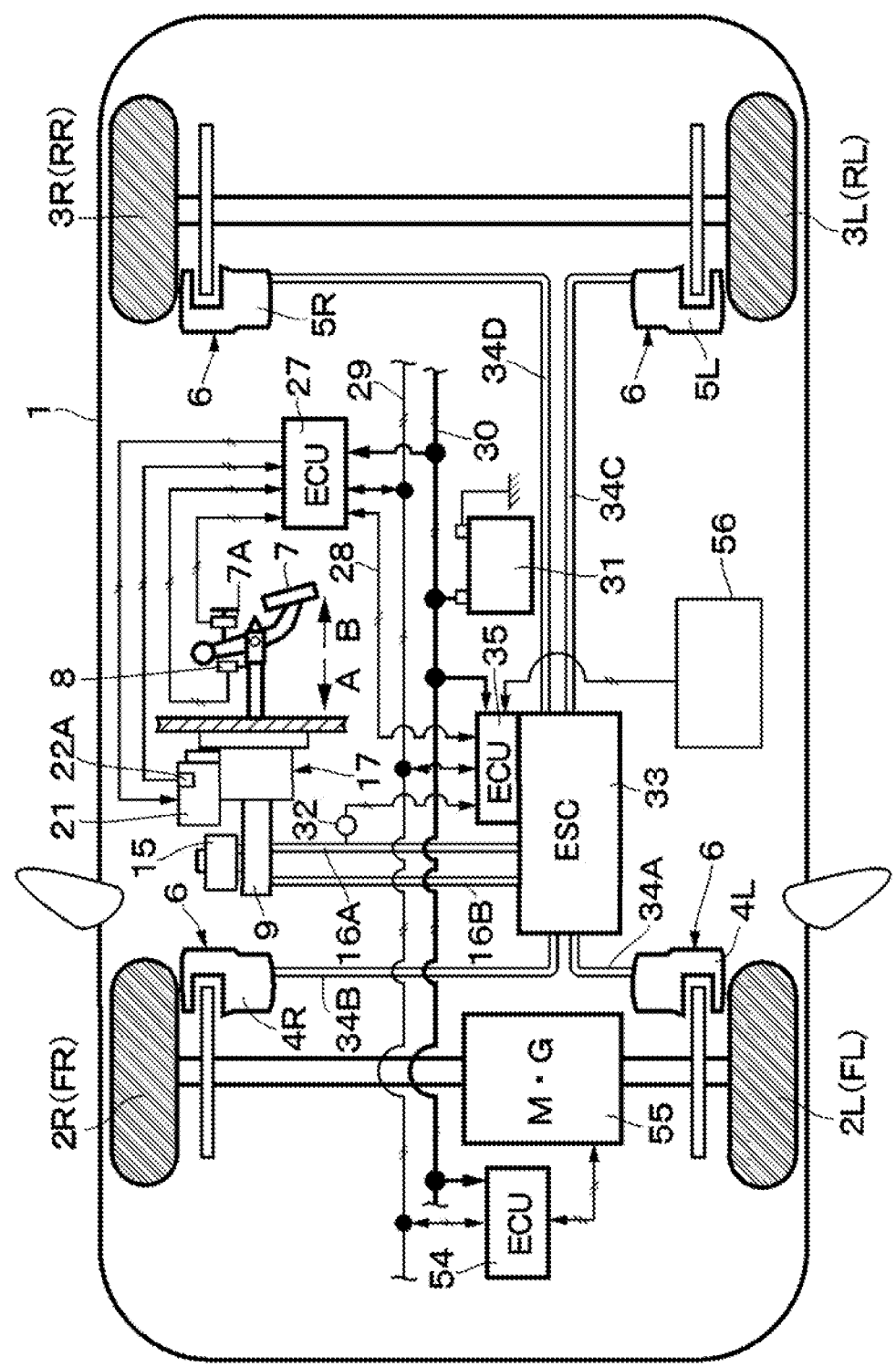
FIG. 1 is a conceptual diagram of a vehicle which installs a brake control system according to an embodiment of the invention.

FIGS. 1 to 5 show an embodiment of the invention. In FIG. 1, for example, left and right front wheels 2L, 2R and left and right rear wheels 3L, 3R are provided on a lower side (a road surface side) of a body 1 which makes up a vehicle. Front wheel side wheel cylinders 4L, 4R are provided individually on the left and right front wheels 2L, 2R, and rear wheel side wheel cylinders 5L, 5R are provided individually on the left and right rear wheels 3L, 3R.

These wheel cylinders 4L, 4R, 5L, 5R constitute cylinders of hydraulic disc brakes or drum brakes and impart braking force to the corresponding wheels (the front wheels 2L, 2R and the rear wheels 3L, 3R). Namely, the wheel cylinders 4L, 4R, 5L, 5R make up friction brake units 6 (for example, disc brakes or drum brakes) together with frictional linings (friction pads or brake shoes) which move upon receipt of hydraulic pressure. The friction brake units 6 are provided individually on the wheels 2L, 2R, 3L, 3R to slow or stop the vehicle by the use of friction produced between the friction linings and rotational members (discs or drums) which rotate together with their corresponding wheels 2L, 2R, 3L, 3R when the friction linings are pressed against their corresponding rotational members.

A brake pedal 7 is provided on a passenger compartment side of a bulkhead of the body 1. A driving person (a driver) depresses the brake pedal 7 in a direction indicated by an arrow W in FIGS. 1 and 2 when he or she attempts to slow or stop the vehicle. A brake switch 7A and a depression amount detection sensor 8 are provided on the brake pedal 7. The brake switch 7A detects whether or not the brakes are applied to slow or stop the vehicle and turns on or off brake lamps (not shown). The depression amount detection sensor 8 detects a depression amount (a stroking amount) of or depressing force applied to the brake pedal 7 and outputs a detection signal to ECUs 27, 35, which will be described later, a vehicle data bus 29 and the like. When the brake pedal 7 is depressed, a brake hydraulic pressure is produced in a master cylinder 9 via an electric booster unit 17, which will be described later.

Figure 2:
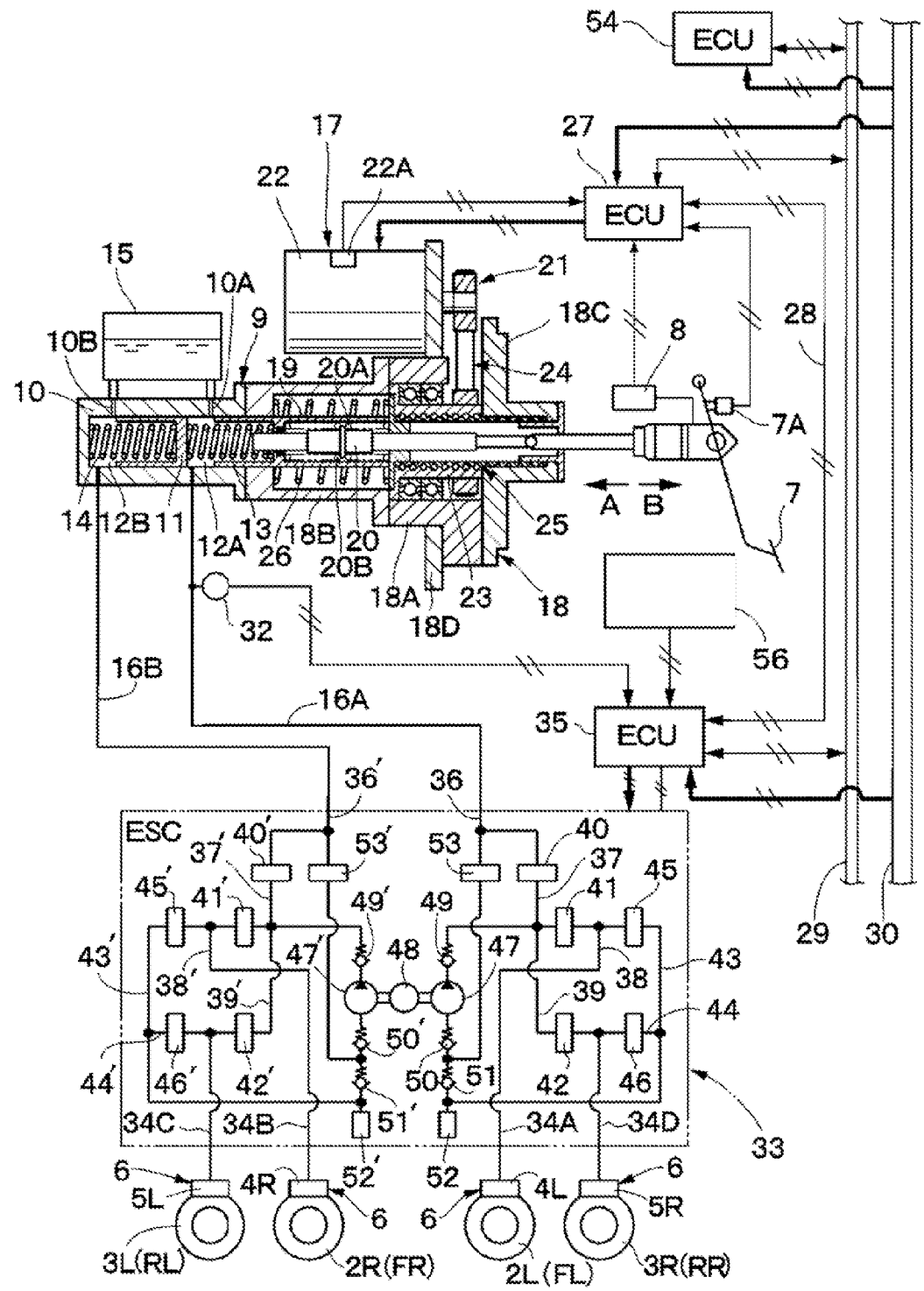
FIG. 2 is a block diagram showing an electric booster unit, a hydraulic pressure supply unit and the like which are shown in FIG. 1.

As shown in FIG. 2, the master cylinder 9 has a bottomed cylindrical cylinder main body 10 which is opened at one end and is closed at the other end by a bottom portion. First and second supply ports 10A, 10B are provided on this cylinder main body 10, and these ports communicate with an interior of a reservoir 15, which will be described later. The first supply port 10A is caused to communicate with or is cut off from a first hydraulic chamber 12A by sliding displacements of a booster piston 19, which will be described later. The second supply port 10B is caused to communicate with or is cut off from a second hydraulic chamber 12B by a second piston 11, which will be described later.

The cylinder main body 10 is secured detachably to a booster housing 18 of the electric booster unit 17, which will be described later, at its open end with a plurality of attaching bolts (not shown). The master cylinder 9 includes the cylinder main body 10, a first piston (the booster piston 19 and an input rod 20, which will be described later) and the second piston 11, the first hydraulic chamber 12A, the second hydraulic chamber 12B, a first return spring 13 and a second return spring. Here, in FIG. 2, signal lines of an electric circuit are denoted by thin lines each provided with pairs of oblique lines scattered along the length thereof, and power supply lines of the electric circuit are denoted by thick lines each provided with pairs of oblique lines scattered along the length thereof. Additionally, hydraulic pipes are denoted by thin lines each provided with no pairs of oblique lines along the length thereof.

In the case of this embodiment, in the master cylinder 9, the first piston is made up of the booster piston 19 and the input rod 20, which will be described later, and the first hydraulic chamber 12A which is formed in the cylinder main body 10 is defined between the second piston 11 and the booster piston 19 (and the input rod 20). The second hydraulic chamber 12B is defined between the bottom portion of the cylinder main body 10 and the second piston 11 in the cylinder main body 10.

The first return spring 13 is positioned within the first hydraulic chamber 12A and is disposed between the booster piston 19 and the second piston 11 to thereby bias the booster piston 19 towards the open end of the cylinder main body 10. The second return spring 14 is positioned within the second hydraulic chamber 12B and is disposed between the bottom portion of the cylinder main body 10 and the second piston 11 to thereby bias the second piston 11 towards the first hydraulic chamber 12A.

The cylinder main body 10 of the master cylinder 9 is such that the booster pin 19 (the input rod 20) and the second piston 11 are displaced towards the bottom portion of the cylinder main body 10 in response to the depression of the brake pedal 7 to thereby cut off the communication of the first and second supply ports 10A, 10B with the interior of the cylinder main body 10, whereupon a brake hydraulic pressure is produced by a brake fluid present in the first and second hydraulic chambers 12A, 12B. On the other hand, when the operation of the brake pedal 7 is released (i.e., when the brake pedal 7 is returned to its non-braking position), the booster piston 19 (and the input rod 20) and the second piston 11 are displaced in a direction indicated by an arrow B towards the open end of the cylinder main body 10 by the first and second return springs 13, 14, whereupon the hydraulic pressures in the first and second hydraulic chambers 12A, 12B are relieved while a brake fluid is supplied thereinto from the reservoir 15.

The reservoir 15, functioning as a working fluid tank which contains the brake fluid in an interior thereof, is provided in the cylinder main body 10 of the master cylinder 9. The reservoir 15 supplies and discharges the brake fluid into and from the hydraulic chambers 12A, 12B in the cylinder main body 10. Namely, while the first supply port 10A is allowed to communicate with the first hydraulic chamber 12A by the booster piston 19 and the second supply port 10B is allowed to communicate with the second hydraulic chamber 12B by the second piston, the brake fluid in the reservoir 15 can be supplied into the hydraulic chambers 12A, 12B via the supply ports 10A, 10B, respectively and the brake fluid supplied into the hydraulic chambers 12A, 12B can be discharged therefrom back into the reservoir 15 via the supply ports 10A, 10B.

On the other hand, when the first supply port 10A is cut off from the hydraulic chamber 12A by the booster piston 19 and the second supply port 10B is cut off from the second hydraulic chamber 12B by the second piston 11, the supply of the brake fluid within the reservoir 15 into the hydraulic chambers 12A, 12B and the discharge of the supplied brake fluid in the hydraulic chambers 12A, 12B therefrom back into the reservoir 15 are cut off. This produces brake hydraulic pressures in the first and second hydraulic chambers 12A, 12B of the master cylinder 9 in association with the depression of the brake pedal 7, and the brake hydraulic pressures so produced are then sent to a hydraulic pressure supply unit 33 (that is, an ESC 33) via a pair of cylinder side hydraulic pipes 16A, 16B, for example.

The electric booster unit 17, functioning as a booster which boosts the operating force (i.e., the depression force applied to the brake pedal 7 prior to boosted by the booster) or a brake unit, is provided between the brake pedal 7 of the vehicle and the master cylinder 9. This electric booster unit 17 controls to vary a brake hydraulic pressure to be produced in the master cylinder 9 by controlling to drive an electric actuator 21 (of an electric motor 22), which will be described later, based on an output from the depression amount detection sensor 8.

The electric booster unit 17 includes the booster housing 18 which is fixedly provided on the bulkhead of the body which constitutes a front wall of the passenger compartment, the booster piston 19 which is a piston provided movably in the booster housing 18 and made to move relative to the input rod 20, which will be described later, and the electric actuator 21, which will be described later, functioning as an actuator which, reciprocates the booster piston 19 in an axial direction of the master cylinder 9 to impart a booster thrust to the booster piston 19.

The booster piston 19 is made up of a cylindrical member which is inserted fittingly in the cylinder main body 10 of the master cylinder 9 so as to slide in the axial direction from the open end of the cylinder body 10. The input rod (the input piston) 20 is fittingly inserted on an inner circumferential side of the booster pin 19, and this input rod 20 is pushed directly by the brake pedal 7 as the brake pedal 7 is depressed so as to reciprocate in the axial direction of the master cylinder 9 (that is, the directions indicated by the arrows A and B). The input rod 20 makes up the first piston of the master cylinder 9 together with the booster pin 19. The brake pedal 7 is connected to a rear (one) end portion of the input rod 20. In the cylinder main body 10, the first hydraulic chamber 12A is defined between, the second piston 11 and the booster pin 19 and the input rod 20.

The booster housing 18 includes a cylindrical speed reduction machine case 15A which accommodates a speed reduction mechanism 24, which will be described later, and the like in an interior thereof, a cylindrical support case 18B which supports the booster pin 19 which is provided between the speed reduction machine case 18A and the cylinder main body 10 of the master cylinder 9 so as to be displaced slidably in the axial direction, and a stepped cylindrical lid member 18C which is disposed on an axially opposite side to the support case 18B across the speed reduction machine case 18A (on one axial side) so as to close an opening at one axial side of the speed reduction machine case 18A. A support plate 18D is provided on an outer circumferential side of the reduction speed machine case 18A so as to support fixedly the electric motor 22, which will be described later.

The input rod 20 is inserted into the booster housing 18 from the lid member 18C side and extends axially in the booster pin 19 towards the first hydraulic chamber 12A. A pair of neutral springs 20A, 20B is interposed between the booster pin 19 and the input rod 20. The booster pin 19 and the input rod 20 are held elastically in a neutral position by means of the spring forces of the neutral springs 20A, 20B, so that the spring forces of the neutral springs 20A, 20B act on the relative displacement of the booster piston 19 and the input rod 20.

When the brake pedal 7 is depressed, a distal end face (a face at the other axial end) of the input rod 20 receives a hydraulic pressure which is produced in the first hydraulic chamber 12A as a braking reaction force, and the input rod 20 transfers the pressure so received to the brake pedal 7. A proper depression response is given to the driver of the vehicle, who can then feel a good pedal, feeling (depression response). As a result of this, the depression feeling of the brake pedal 7 can be improved, and a good pedal feeling (a good, depression, response) can be maintained. Additionally, the input rod 20 is constructed so as to be brought into abutment with the booster piston 19 when it advances a predetermined amount, thereby making it possible to advance the booster piston 19. This construction enables the booster pin 19 to be advanced by the depressing force applied to the brake pedal 7 to thereby produce a hydraulic pressure in the master cylinder 9 in the event that the electric actuator 21, which will be descried later, and the first ECU 27 fail.

The electric actuator 21 of the electric booster unit 17 includes the electric motor 22 which is provided in the speed reduction machine case 18A of the booster housing 18 via a support plate 18D, a speed reduction mechanism 24 such as a belt or the like which decelerates the rotation of the electric motor 22 for transmission to the cylindrical rotational member 23 in the speed reduction machine case 18A, and a direct acting mechanism 25 such as a ball screw or the like which converts a rotation of the cylindrical rotational member 23 to an axial displacement of the booster piston 19. Front end portions (the other axial end portions) of the booster piston 19 and the input rod 20 are oriented to the first hydraulic chamber 12A of the master cylinder 9 so as to produce a brake hydraulic pressure within the master cylinder 9 by means of the depression force (the thrust) which is transferred from the brake pedal 7 to the input rod 20 and the booster thrust which is transferred from the electric actuator 21 to the booster piston 19.

Namely, the booster piston 19 of the electric booster unit 17 makes up a pump mechanism which is driven by the electric actuator 21 based on an output (that is, a detection signal) of the depression amount detection sensor 8 to thereby produce a brake hydraulic pressure (a master cylinder pressure) within the master cylinder 9. A return spring 26 is provided in the support case 18B of the booster housing 18, and this return spring 26 normally biases the booster piston 19 in a direction in which the brake is released (in the direction indicated by the arrow B in FIGS. 1 and 2). When the brake pedal 7 is released (when the brake is released), the electric motor 22 is rotated, in an opposite direction, and the booster piston 19 is returned to its initial position shown in FIG. 2 in the direction indicated by the arrow B by virtue of the biasing force of the return spring 26.

The electric motor 22 is made up of a DC brushless motor, for example, and includes a rotation sensor 22A called a resolver and a current sensor (not shown) which detects a motor current. The rotation sensor 22A detects a rotational position of the electric motor 22 (a rotation angle of a motor shaft of the electric motor) and outputs a detection signal to the control unit of a first control circuit (hereinafter, referred to as the first ECU 27). The first ECU 27 executes a feedback control based on this rational position detection signal. Additionally, the rotation sensor 22A also functions a rotation detection unit configured to detect an absolute displacement of the booster piston 19 relative to the body based on the detected rotational position of the electric motor 22.

Further, the rotation sensor 22A makes up a displacement detection unit configured to detect a relative displacement between the booster piston 19 and the input rod 20 together with the depression amount detection sensor 8 and detection signals of these sensors are sent to the first ECU 27. The rotation detection unit is not limited the rotation sensor 22A such as the resolver, and hence, the rotation detection unit may be made up of a rotational potentiometer which can detect an absolute displacement (angle). The speed reduction mechanism 24 is not limited to the belt or the like and hence may be made up of a gear type speed reduction machine. Additionally, the direct acting mechanism 25 which converts a rotation motion into a linear motion can foe made up of, for example, a rack and pinion mechanism or the like. Further, the speed reduction machine 24 does not necessarily have to be provided, and for example, a configuration may foe adopted in which a motor shaft is provided integrally on the cylindrical rotational member 23, anal a stator of the electric motor is disposed on the periphery of the cylindrical rotational member 23, so that the cylindrical rotational member 23 is rotated directly by the electric motor.

The first ECU 27 is made up of, for example, a microcomputer and makes up part of the electric booster unit 17. The first ECU 27 makes up a control unit (a friction brake control unit) which configures the friction brake units 6 together with the second ECU 35, which will be described later. Specifically, the first ECU 27 makes up a first control circuit (an electric booster unit controller) which controls to drive electrically the electric actuator 21 (the electric motor 22) of the electric booster unit 17.

An input side of the first ECU 27 is connected to the brake switch 7A which detects whether or not the brake pedal 7 is depressed, the depression amount detection sensor 3 which detects a depression amount of or depression force applied to the brake pedal 7, the rotation sensor 22A and the current sensor of the electric motor 22, an onboard signal line 28 such as one called an L-CAN, for example, which can communicate, a vehicle data bus 29 which transmits and receives signals to and from an ECU for other vehicle devices (for example, a third ECU 54, which will be described later) and the like. The vehicle data bus 29 is an onboard serial communication device called a V-CAN and executes onboard multiplex communications. Additionally, the first ECU 27 is connected with a power supply line 30 and is fed with electric power from a battery 31 (refer to FIG. 1) by way of the power supply line 30.

A hydraulic pressure sensor 32 as a hydraulic pressure detection device configured to detect a brake hydraulic pressure in the master cylinder 9 detects a hydraulic pressure in the cylinder side hydraulic pipe 16A, for example, and detects a brake hydraulic pressure which is supplied from the master cylinder 9 to the ESC 33, which will be described later, by way of the cylinder side hydraulic pipe 16A. In this embodiment, the hydraulic pressure sensor 32 is electrically connected to the second ECU 35, which will be described later, and a detection signal produced by the hydraulic pressure sensor 32 is sent through communication from the second ECU 35 to the first ECU 27 by way of the signal line 28. As long as it can detect a hydraulic pressure in the master cylinder 9, the hydraulic pressure sensor 32 may be attached directly to the master cylinder 9, or the detection signal may be inputted directly into the first ECU 27 without involving the second ECU 35.

An output side of the first ECU 27 is connected to the electric motor 22, the onboard signal line 28, the vehicle data bus 29 and the like. The first ECU 27 controls variably a brake hydraulic pressure to be produced in the master cylinder 9 by the use of the electric actuator 21 based on detection signals from the depression amount detection sensor 8 and the hydraulic pressure sensor 32 and also functions to determine whether or not the electric booster unit 17 operates normally.

Here, in the electric booster unit 17, when the brake pedal 7 is depressed, the input rod 20 advances towards the interior of the cylinder main body 10 of the master cylinder 9, and the movement of the input rod 20 then is detected by the depression amount detection sensor 8. The first ECU 27 outputs an activation command to the electric motor 22 in response to the detection signal from the depression amount detection sensor 8 so as to drive to rotate the electric motor 22. Then, the rotation of the electric motor 22 is transferred to the cylindrical rotational member 23 by way of the speed reduction mechanism 24, and the rotation of the cylindrical rotational member 23 is converted into an axial displacement of the booster piston 19 by the direct acting mechanism 25.

As this occurs, the booster pin 19 advances together with the input rod 20 into the interior of the cylinder main body 10 of the master cylinder 9, whereby a brake hydraulic pressure which matches the depressing force (thrust) imparted to the input rod 20 by the brake pedal 7 and the booster thrust imparted to the booster piston 19 by the electric actuator 21 is produced in the first and second hydraulic pressure chambers 12A, 12B. In the event that a total braking force required by the vehicle is distributed to a frictional braking force produced by the friction linings of the friction brake units 6 and a regenerative braking force produced by a motor-generator 55 (refer to FIG. 1), which will be descried later, that is, in the event that a total braking force required by the vehicle is obtained by both the frictional braking force (the friction brakes) and the regenerative braking force (a regenerative brake), the booster piston 19 is displaced by the electric actuator 21 so that the brake hydraulic pressure is reduced by an amount corresponding to the regenerative braking force.

The first ECU 27 can monitor the hydraulic pressure produced in the master cylinder 9 by receiving the detection signal produced by the hydraulic pressure sensor 32 from the signal, line 28 to thereby determine whether or not the electric booster unit 17 operates normally.

Next, the hydraulic pressure supply unit 33 (that is, the ESC 33) will be described which is provided between the wheel cylinders 4L, 4R, 5L, 5R disposed individually at the wheels (front wheels 2L, 2R and the rear wheels 3L, 3R) of the vehicle and the master cylinder 9.

The ESC 33 makes up a wheel cylinder pressures control unit which controls variably a brake hydraulic pressure produced in the master cylinder 9 (the first and second hydraulic pressure chambers 12A, 12B) by the electric booster unit 17 as wheel cylinder pressures at the wheels so as to supply these wheel cylinder pressures individually to the respective wheel cylinders 4L, 4R, 5L, 5R of the wheels (the front wheels 2L, 2R and the rear wheels 3L, 3R).

When various brake controls (for example, a braking force distribution control in which a braking force is distributed to each of the front wheels 2L, 2R and the rear wheels 3L, 3R, an anti-lock braking control, a vehicle stabilization control and the like) are executed, the ESC 33 supplies required brake hydraulic pressures from, the master cylinder 9 to the wheel cylinders 4L, 4R, 5L, 5R by way of the cylinder side hydraulic pipes 16A, 16B and the like.

Here, the ESC 33 distributes and supplies hydraulic pressures which are outputted from the master cylinder 9 (the first and second hydraulic pressure chambers 12A, 12B) by way of the cylinder side hydraulic pipes 16A, 16B to the wheel cylinders 4L, 4R, 5L, 5R by way of brake side pipes 34A, 34B, 34C, 34D. This imparts individually independent braking forces to the wheels (the front wheels 2L, 2R and the rear wheels 5L, 5R) as has been described above. The ESC 33 includes control valves 40, 40', 41, 41', 42, 42', 45, 45', 46, 46', 53, 53', an electric motor 48 which drives hydraulic pumps 47, 47', and hydraulic pressure controlling reservoirs 52, 52'.

The second ECU 35 is made up of, for example, a microcomputer or the like and makes up part of the ESC 33. The second ECU 35 makes up the control unit (the friction brake control unit) which controls the friction brake units 6 together with the first ECU 27. Specifically, the second ECU 35 makes up a second control circuit (a hydraulic pressure supply unit controller) which electrically controls to drive the ESC 33. An input side of the second ECU 35 is connected to the hydraulic pressure sensor 32, the signal line 28, the vehicle data bus 29, and a slip amount detector 56, which will foe described later. An output side of the second ECU 35 is connected to the control valves 40, 40', 41, 41', 42, 42', 45, 45', 46, 46', 53, 53', the electric motor 43, the signal line 28, the vehicle data bus 29 and the like. Additionally, the second ECU 35 is connected to the power supply line 30 and is fed with the electric power from the battery 31 (refer to FIG. 1) by way of the power supply line 30.

Here, the second ECU 35 controls to drive individually the control valves 40, 40', 41, 41', 42, 42', 45, 45', 46, 46', 53, 53', the electric motor 43 and the like, as will be described later. Through these individual driving controls, the second ECU 35 controls individually the wheel cylinders 4L, 4R, 5L, 5R to reduce, hold, increase or pressurize the brake hydraulic pressures which are supplied from the brake side pipes 34A to 34D to the wheel cylinders 4L, 4R, 5L, 5R.

Namely, the second ECU 35 controls the operation of the ESC 33 to thereby execute the following controls: a braking force distribution control in which a braking force is distributed as required to the wheels (the front wheels 2L, 2R and the rear wheels 3L, 3R) according to ground loads acting on the wheels when the brakes are applied; an anti-lock braking control in which braking forces at the wheels 2L, 2R, 3L, 3R are automatically controlled to prevent the wheels 2L, 2R, 3L, 3R from, being locked when the brakes are applied; a vehicle stabilizing control in which braking forces to be imparted to the wheels 2L, 2R, 3L, 3R irrespective of the depression amount of the brake pedal 7 when detecting them skidding are controlled automatically as required to thereby restrict understeer conditions and oversteer conditions so as to stabilize the behavior of the vehicle, a hill start assisting control in which a start of the vehicle which is stopped on a hill (especially, on an uphill) is assisted while holding the braked conditions, a traction control in which the wheels are prevented from spinning at the start of the vehicle or the like, a vehicle following control in which a following vehicle is driven while maintaining a constant distance from a preceding vehicle, a lane departing avoidance control in which a vehicle is driven while keeping its lane, and an obstacle avoidance control in which a vehicle is controlled to avoid a collision with an obstacle ahead or behind thereof.

The ESC 33 includes two hydraulic circuits, that is, a first hydraulic circuit or system 36 and a second hydraulic circuit or system 36'. In the first hydraulic system 36, the ESC 33 is connected to one of the output ports (that is, the cylinder side hydraulic pipe 16A) of the master cylinder 9 to supply the hydraulic pressure to the wheel cylinder 4L of the left front wheel (FL) and the wheel cylinder 5R at the right rear wheel (RR). In the second hydraulic system 36', the ESC 33 is connected to the other output port (that is, the cylinder side hydraulic pipe 16B) of the master cylinder 9 to supply the hydraulic pressure to the wheel cylinder 4R at the right front wheel (PR) and the wheel cylinder 5L at the left rear wheel (RL). Here, since the first hydraulic system 36 and the second hydraulic system 36' have similar configurations, in the following description, only the first hydraulic system 36 will be described. In relation to the second hydraulic system 36', "'" will be added to individual constituent elements and the description thereof will be omitted.

The first hydraulic system 36 of the ESC 33 has a brake line 37 which is connected to a distal end of the cylinder side hydraulic pipe 16A. The brake line 37 branches into two line portions of a first line portion 33 and a second line portion 39, which are then connected to the wheel cylinders 4L, 5R, respectively. The brake line 37 and the first line portion 38 make up together with the brake side pipe 34A a line which supplies the hydraulic pressure to the wheel cylinder 4L. The brake line 37 and the second line portion 39 make up together with the brake side pipe 34D a line which supplies the hydraulic pressure to the wheel cylinder 5R.

A brake hydraulic pressure supply control valve 40 is provided in the brake line 37, and this supply control valve 40 is made up of a normally open solenoid selector valve which opens and closes the brake line 37. A hydraulic pressure increase control valve 41 is provided in the first line portion 38, and this hydraulic pressure increase control valve 41 is made up of a normally open solenoid selector valve which opens and closes the first line portion 38. The hydraulic pressure increase control valve 42 is provided in the second line portion 39, and this hydraulic pressure increase control valve 42 is made up of a normally open solenoid selector valve which opens and closes the second line portion 39.

On the other hand, the first hydraulic circuit 36 of the ESC 33 has first and second hydraulic pressure reduction lines 43, 44 which connect the hydraulic pressure controlling reservoir 52 to the wheel cylinders 4L, 5R, respectively. Then, first and second hydraulic pressure reduction control valves 45, 46 are provided in the hydraulic pressure reduction lines 43, 44, respectively. The first and second hydraulic pressure reduction control valves 45, 46 are made up of normally closed solenoid selector valves which open and close the hydraulic pressure reduction lines 43, 44.

The ESC 33 includes the hydraulic pump 47 as a hydraulic pressure production unit which constitutes a hydraulic pressure source. This hydraulic pump 47 is driven to rotate by the electric motor 43. Here, the electric motor 48 is driven by being fed with electric power from the second ECU 35, and when the supply of electric power is stopped, the electric motor 48 stops rotating together with the hydraulic pump 47. A discharge side of the hydraulic pump 47 is connected to a position along the first line portion 38 which lies downstream of the supply control valve 40 (that is, a position where the brake line 37 branches into the first line portion 38 and the second line portion 39) via a check valve 49. A suction side of the hydraulic pump 47 is connected to the hydraulic pressure controlling reservoir 52 via check valves 50, 51.

The hydraulic pressure controlling reservoir 52 is provided to reserve extra brake fluid temporarily and temporarily reserves extra brake fluid which flows out of cylinder chambers (not shown) of the wheel cylinders 4L, 5R not only when the brake system (the SSC 33) executes the anti-lock braking control but also when the brake system executes the other brake controls. Additionally, the suction side of the hydraulic pump 47 is also connected to the cylinder side hydraulic pipe 16A of the master cylinder 9 (that is, a position on the brake line 37 which lies upstream of the supply control valve 40) via the check valve 50 and the pressurization control valve 53 which is a normally closed solenoid selector valve.

The operations of the control valves 40, 40', 41, 41', 42, 42', 45, 45', 46, 46', 53, 53' which make up the ESC 33 and the electric motor 48 which drives the hydraulic pumps 47, 47' are controlled based on control signals which are outputted from the second ECU 35.

Namely, when operating normally based on the depression of the brake pedal 7 by the driver, the first hydraulic system 36 of the ESC 33 supplies the hydraulic pressure produced in the master cylinder 9 by the electric booster unit 17 directly to the wheel cylinders 4L, 5R by way of the brake line 37 and the first and second line portions 38, 39. For example, when the anti-lock braking control or the lie is executed, the hydraulic pressures in the wheel cylinders 4L, 5R are held by closing the hydraulic pressure increase control valves 41, 42, and when the hydraulic pressures in the wheel, cylinders 4L, 5R are reduced, the hydraulic pressure reduction control valves 45, 46 are opened to thereby discharge the hydraulic pressures in the wheel cylinders 4L, 5R so as to be relieved to the hydraulic pressure controlling reservoir 52.

In addition, when the hydraulic pressures supplied to the wheel cylinders 4L, 5R are increased to execute the stabilization control (the skid preventing control) of the vehicle which is running, the hydraulic pump 47 is activated to operate by the electric motor 48 with the supply control valve 40 closed, and the brake fluid discharged from the hydraulic pump 47 is supplied to the wheel cylinders 4L, 5R via the first and second line portions 38, 39. As this occurs, due to the pressurization control valve 53 being opened, the brake fluid in the reservoir 15 is supplied from the master cylinder 9 to the suction side of the hydraulic pump 47.

In this way, the second ECU 35 controls the operations of the supply control valve, the hydraulic pressure increase control valves 41, 42, the hydraulic pressure reduction control valves 45, 46, the pressurization control valve 53 and the electric motor 43 (that is, the hydraulic pump 47) to thereby hold, reduce or increase the hydraulic pressures to foe supplied to the wheel cylinders 4L, 5R. By controlling the operations of the control valves and the like by the second ECU 35, the brake controls described above such as the braking force distribution control, the vehicle stabilization control, the brake assisting control, the anti-lock braking control, the traction control, the hill start assisting control and the like are executed.

On the other hand, in the normal braking mode which is carried out with the electric motor 48 (that is, the hydraulic pump 47) stopped, the supply control valve 40 and the hydraulic pressure increase control valves 41 42 are opened, and the hydraulic pressure reduction control valves 45, 46 are closed. The brake hydraulic pressure produced in the first hydraulic pressure chamber 12A when the first piston (that is, the booster piston 19 and the input rod 20) and the second piston 11 of the master cylinder 9 are displaced in the axial direction in the interior of the cylinder main body 10 in response to the depression of the brake pedal 7 with the control valves staying in the states described above is supplied from the cylinder side hydraulic pipe 18A to the wheel cylinders 4L, 5R by way of the first hydraulic system 36 of the ESC 33 and the brake side pipes 34A, 34D. The brake hydraulic pressure produced in the second hydraulic pressure chamber 12B is supplied from the cylinder side hydraulic pipe 16B to the wheel cylinders 4R, 5L by way of the second hydraulic system 36' and the brake side pipes 34B, 34C.

In case the booster piston 19 cannot be activated to operate by the electric motor 22 due to the failure of the electric booster unit 17, the brake hydraulic pressures produced in the first and second hydraulic pressure chambers 12A, 12B are detected by the hydraulic pressure sensor 32 which is connected to the second ECO 35, and an assisting control is executed in which with the detection values used as the depression amount of the brake pedal 7, the hydraulic pressures in the wheel cylinders 4L, 5R are increased so that the wheel cylinder pressures correspond to the detection values. In this assisting control, the pressurization control valve 53 and the hydraulic pressure increase control valves 41, 42 are opened, and the supply control valve 40 and the hydraulic pressure reduction control valves 45, 46 are opened and closed as required. In this state, the hydraulic pump 47 is activated to operate by the electric motor 48, and the brake fluid discharged from the hydraulic pump 47 is then supplied to the wheel cylinders 4L, 5R by way of the first and second line portions 38, 39. This enables the wheel cylinders 4L, 5R to produce braking forces by the use of the brake fluid discharged from the hydraulic pump 47 based on the brake hydraulic pressure produced, in the master cylinder 9.

Although a known hydraulic pump such as a plunger pump, a trochoid pump, a gear pump or the like can be used as the hydraulic pump 47, the gear pump is desirable in consideration of installation in the vehicle, quietness, pump efficiency and the like. Although a known motor such as a DC motor, a DC brushless motor, an AC motor or the like can be used as the electric motor 48, in this embodiment, the DC motor is used from the viewpoint of installation in the vehicle.

Although the characteristics of the control, valves 40, 41, 42, 45, 46, 53 of the ESC 33 can be set as required according to forms in which they are used, in these control valves, the supply control, valve 40 and the hydraulic pressure increase control valves 41, 42 are made up ox normally open valves and the hydraulic pressure reduction control valves 45, 46 and the pressurization control valve 53 are made up of normally closed valves, whereby even in case no control signal is sent from the second ECU 35, the hydraulic pressure can be supplied from the master cylinder 9 to the wheel cylinders 4L to 5R. Consequently, from the viewpoint of fail-safe of the brake system and control efficiency, it is desirable to adopt the configuration described above.

On the other hand, the third ECU 54 is connected to the vehicle data bus 29 which is installed in the vehicle, and this third ECU 54 functions as a third control circuit (an electric power charging controller, a regeneration cooperative control unit) which controls electrically the driving of the motor-generator 55 (refer to FIG. 1), which will foe described later. Similar to the first and second ECUs 27, 35, the third ECU 54 is made up of a microcomputer or the like and includes, for example, a motor-generator controller (a control unit) which controls the driving conditions (power running, regeneration) of the motor-generator 55.

In this case, the third ECU 54 is such that a braking force is obtained while recovering (regenerating) kinetic energy as electric power by controlling the motor-generator 55 which is the drive motor (the electric motor) of the vehicle by making use of the inertial force produced by the rotation of the wheels (in this embodiment, the front wheels 2L, 2R) when slowing or braking the vehicle. The third ECU 54 is connected to the first and second ECUs 27, 35 by way of the vehicle data bus 29 to make up a control unit for controlling the amount of regenerative braking (a regenerative braking control unit). In addition, the third ECU 54 is connected to the power supply line 30 and is fed with electric power from the battery 31 (refer to FIG. 1) through the power supply line 30.

The motor-generator (M-G) 55 which is a regeneration control unit connected to the third ECU 54 is configured as an electric motor (a generating motor) which drives the vehicle for acceleration when the vehicle is attempted to be accelerated and which generates (regenerates) electric power based on the inertial force of the vehicle when the vehicle is decelerated. Namely, the motor-generator 55 functions, for example, as a motor (an electric motor) which generates torque (a rotational force) to drive the vehicle based on electric power stored in a battery unit (not shown) of the vehicle and as a generator (a generator) which generates electric power based on the running inertial force of the vehicle. In FIG. 1, although only the motor-generator 55 is shown as the drive source of the vehicle, for example, in case the vehicle is an electric vehicle, the motor-generator 55 constitutes a drive source for driving the vehicle, while in case the vehicle is a hybrid electric vehicle, the motor-generator 55 and an engine (an internal combustion engine), not shown, constitute a drive source for driving the vehicle.

Next, a regeneration cooperative control will be described which is carried out by the third ECU 54 and the first ECU 27. Here, the regeneration cooperative control means a brake control in which, when slowing or braking the vehicle, a total braking force desired for the vehicle is obtained by both of (i) recovering (regenerating) the kinetic energy as electric power by rotating the motor-generator 55 based on the inertial force of the vehicle, and (ii) adjusting the braking force by the friction linings of the friction brake units 6 (frictional braking force) by subtracting the regenerative braking force produced by regeneration, of the motor-generator 55 (a regenerative braking force) from the depression amount of the brake pedal by the driver.

Namely, in case when the brake pedal 7 is depressed, a frictional braking force corresponding to the depression amount of the brake pedal 7 is produced as it is while allowing a regenerative braking force to be produced based on the kinetic energy of the motor-generator 55, the total braking force for the vehicle becomes excessive. Then, in the regeneration cooperative control, the hydraulic pressure produced in the master cylinder 9 is reduced by an amount corresponding to the regenerative braking force by changing the control amount of the electric booster unit 17 (the electric motor 22) relative to the depression amount of the brake pedal 7, whereby a desired braking force corresponding to the depression of the brake pedal 7 is obtained by the braking force provided by the frictional braking and the braking force provided by the regenerative braking.

Here, a maximum value of regenerative braking which is produced by the regeneration cooperative control is regulated by an amount of hydraulic pressure which can be reduced realistically in the master cylinder 9 by changing the control amount of the electric motor 22 of the electric booster unit 17. Because of this, a required amount of regenerative braking is transmitted from the first ECU 27 which controls the electric motor 22 to the third ECU 54 which controls the motor-generator 55 by way of the vehicle data bus 29. Although this required amount of regenerative braking is regulated in the first ECU 27, since it is the third ECU 54 that causes the motor-generator 55 to produce a regenerative braking force, there is a possibility that the required amount of regenerative braking differs from an actual amount of regenerative braking.

In case the actual amount of regenerative braking differs from the required amount of regenerative braking, the total amount of braking becomes small which is a combination of an amount of fractional braking based on hydraulic pressure and an amount of regenerative braking executed by the motor-generator 55. Because of this, there are fears that the deceleration is lost or reduced. In order to restrict the occurrence of deceleration loss or reduction, an amount of regenerative braking which is actually produced is transmitted as an amount of regenerative braking which is actually executed from the third ECU 54 to the first ECU 27 through the vehicle data bus 29. The first ECU 27 regulates, based on the amount of regenerative braking which is actually executed so received, the amount of hydraulic pressure to be reduced in the master cylinder 9 corresponding to the amount of regenerative braking which is actually executed, drives the electrical motor 22 in order to produce the amount of friction braking after addition of the amount of hydraulic pressure to foe reduced, and produces a desired, braking force calculated based on the amount of brake operating amount by the driver. The amount of regenerative braking which is actually executed should never fail to be equal to or larger than the required, amount of regenerative braking.

Incidentally, the following driving scene may occur in a vehicle in which the regeneration cooperative control is executed. Namely, when the driver depresses the brake pedal 7 while driving the vehicle, activating the regeneration cooperative control to operate, since the amount of frictional braking is reduced by the amount corresponding to the amount of regenerative braking as described above, the total amount of braking applied, on the drive wheels (in the case of this embodiment, the front wheels 2L, 2R) becomes larger than when the regeneration cooperative control is not executed. As this occurs, in case the total amount of braking applied on the drive wheels is larger than a limit slip amount, there are fears that the drive wheels slip when the vehicle is turning. As this occurs, an oversteer (or understeer) condition occurs, resulting in an unstable behavior of the vehicle. Additionally, the total amount of braking applied on the drive wheels becomes large, which causes the drive wheels to slip, leading to fears that the so-called early intervention of the anti-lock braking control is caused in which the anti-lock braking control by the ESC 33 is started earlier than when the regeneration cooperative control is not executed.

Then, in this embodiment, the slip amount for slip ratio) of the front wheels 2L, 2R which constitute the drive wheels is detected, and in case the total amount of braking applied on the drive wheels (the front wheels 21, 2R) is larger than the slip limit amount, the total amount of braking applied on the drive wheels (the front wheels 2L, 2R) is made small toy reducing largely the amount of regenerative braking in an initial stage of slip, so as to realize the restriction of change in behavior of the vehicle and early intervention of the anti-lock braking control. Because of this, the slip amount detector 56 is connected to the second ECU 35, and this slip amount detector 56 is configured to detect slip amounts (or slip ratios) of the wheels 2L, 2R, 3L, 3R which are fitted on the vehicle.

The slip amount detector 56 can be made up of, for example, wheel speed sensors which detects rotational speeds of the corresponding wheels 2L, 2R, 3L, 3R. As this occurs, a slip amount of the front wheels 2L, 2R which constitute the drive wheels can be calculated based on a difference in rotational speed between the front wheels 2L, 2R which constitute the drive wheels and the rear wheels 3L, 3R which constitute driven wheels. Additionally, the slip amount detector 56 can also be made up of the wheel speed sensors which detect the rotational speeds of the front wheels 2L, 2R which constitute the drive wheels and a vehicle speed sensor which detects a rotational speed of a rotational shape of a transmission. As this occurs, a slip amount of the front wheels 2L, 2R which constitute the drive wheels can be calculated based on a difference between the wheel speeds detected by the wheel speed sensors and the vehicle speed (the body speed, the vehicle speed) which is detected by the vehicle speed sensor. In FIGS. 1, 2, as a matter of convenience in description, although the slip amount detector 56 and the second ECU 35 of the SSC 33 are shown separately, the slip amount detecting function may be incorporated in the second ECU 35. As this occurs, the wheel speed sensors which detects the rotational speeds of the wheels 2L, 2R, 3L, 3R are connected to the second ECU 35.

On the other hand, for example, the first ECU 27 has a regenerative slip control unit (operations in a step 3 and a step 6 in FIG. 3, which will be described later) which reduces the amount of regenerative braking by the motor-generator 55 when the wheels (specifically speaking, the front wheels 2L, 2R which constitute the drive wheels) are detected as slipping based on the detection value of the slip amount detector 56 which the regenerative slip control unit receives via the second ECU 35 and the vehicle data, bus 25 during the regenerative braking by the motor-generator 55. This regenerative slip control unit executes repeatedly a slip restricting control in which, the amount of regenerative braking by the motor-generator 55 is reduced by a predetermined amount and thereafter, the resulting reduced amount of regenerative braking is held for a predetermined period of time while the front wheels 21, 22 which constitute the drive wheel are being detected as slipping based on the detection value of the slip amount detector 56 during the regenerative braking by the motor-generator 55.

Figure 4:
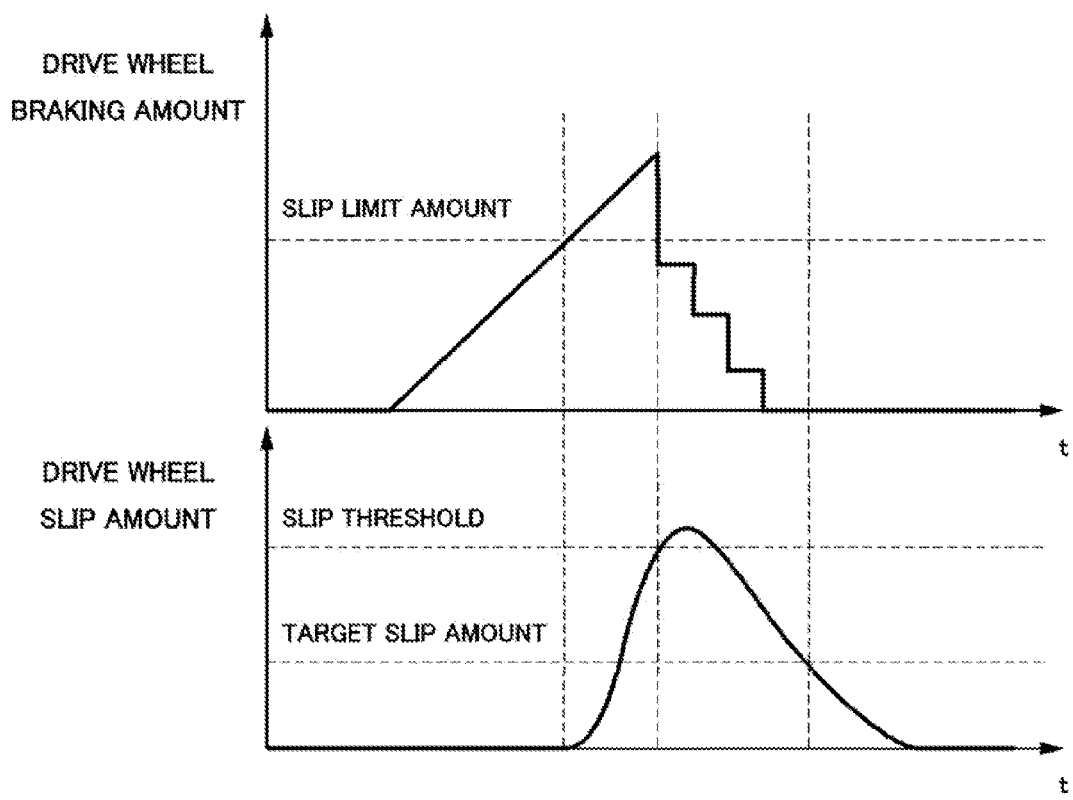
FIG. 4 is a characteristic curve chart showing an example of a change with, time in drive wheel braking amount and drive wheel slip amount according to the embodiment.
Figure 5:
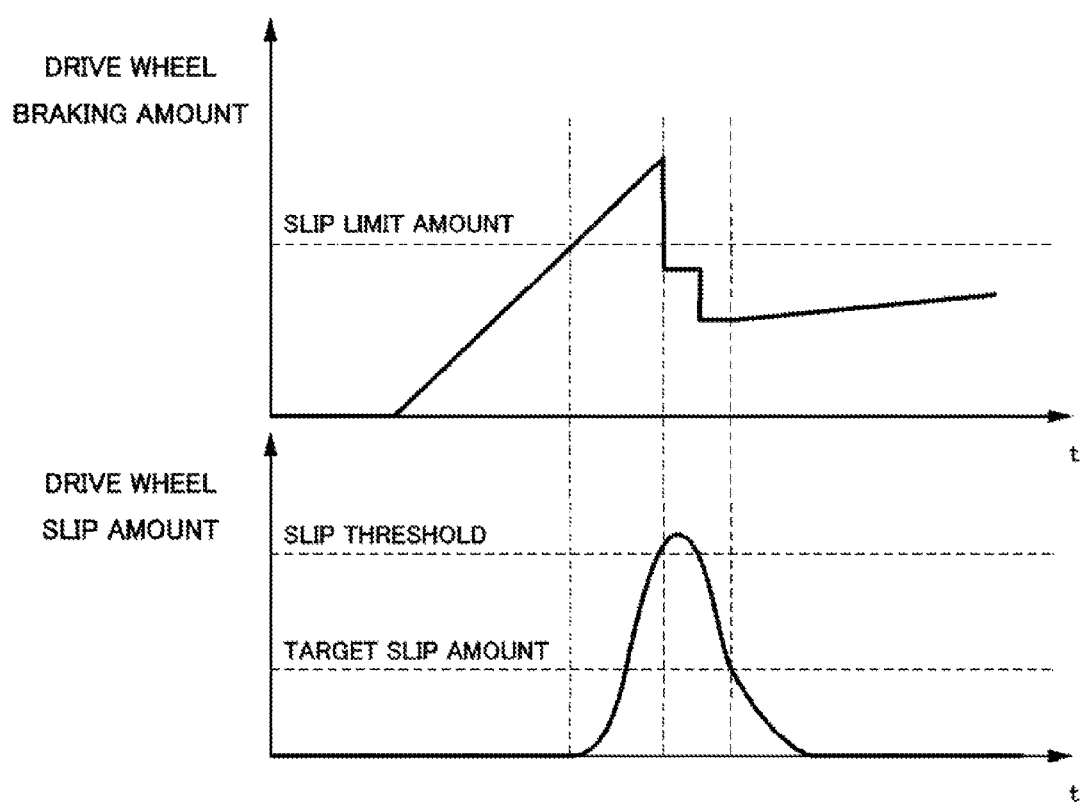
FIG. 5 is a characteristic curve chart showing another example of a change with time in drive wheel braking amount and drive wheel slip amount.

As this occurs, in the regenerative slip control unit, the predetermined reduction amount of regenerative braking when the wheels (the front wheels 2L, 2R) are detected as slipping (for example, the first predetermined, reduction amount) is set larger than the predetermined reduction amount of regenerative braking in the subsequent slip restricting control (for example, the second predetermined reduction amount). Namely, as shown in FIGS. 4 and 5, which will be described later, the regenerative slip control unit reduces the amount of regenerative braking by the motor-generator 55 when the slip amount of the drive wheels equals or exceeds a slip threshold to thereby reduce the amount of braking applied on the drive wheels step by step. As this occurs, the reduction amount of regenerative braking is set so that the initial (for example, the first) reduction amount is larger than the subsequent (for example, the second) reduction amount. By setting the reduction amounts in that way, the behavior of the vehicle can be maintained stable when a slip occurs due to the intervention of regenerative braking. A process shown in FIG. 3 which is to be executed by the first ECU 27 will be described later.

The brake control system according to this embodiment is configured in the way described heretofore, and the operation thereof will be described next.

Firstly, when the driver of the vehicle depresses the brake pedal 7, the input rod 20 is pushed in a direction indicated by an arrow A, and a detection signal is inputted from the depression amount detection sensor 8 into the first ECU 27. The first ECU 27 controls the operation of the electric actuator 21 of the electric booster unit 17 according to a detection value signaled by the detection signal. Namely, the first ECU 27 feeds the electric motor 22 based on the detection signal from the depression amount detection sensor 8 so as to control to drive the electric motor 22. As this occurs, the first ECU 27 calculates a braking force (a frictional braking force) to be produced at each of the friction brake units 6 which results from subtracting a braking force (a regenerative braking force) produced by the motor-generator 55 from a braking force (a total braking force required by the vehicle) according to the driver's intention which corresponds to the stroke amount of the brake pedal 7 and feeds the electric motor 22 to control and drive the electric motor 22 so that a hydraulic pressure is produced to obtain the braking force calculated.

The rotation of the electric motor 22 is transferred to the cylindrical rotational member 23 via the speed reduction mechanism 24, and the rotation of the cylindrical rotational member is converted into an axial displacement of the booster piston 19 by the direct acting mechanism 25. This displaces the booster piston 19 of the electric booster unit 17 in an advancing direction towards the interior of the cylinder main body 10 of the master cylinder 9, whereby brake hydraulic pressures according to the depressing force (thrust) which is imparted from the brake pedal 7 to the input rod 20 and the booster thrust imparted from the electric actuator 21 to the booster piston 19 are produced in the first and second hydraulic pressure chambers 12A, 12B.

Next, the ESC 33 which is provided between the wheel cylinders 4L, 4R, 5L, 5R in the wheels (the front wheels 2L, 2R and the rear wheels 3L, 3R) and the master cylinder 9 distributes to supply the hydraulic pressure produced by the electric booster unit 17 in the master cylinder 9 (the first and second hydraulic pressure chambers 12A, 12B) as a master cylinder pressure to the wheel cylinders 4L, 4R, 5L, 5R as wheel cylinder pressures at the individual wheels from the cylinder side hydraulic pipes 16A, 16B by way of the hydraulic systems 36, 36' in the ESC 33 and the brake side pipe portions 34A, 34B, 34C, 34D while variably controlling the hydraulic pressure or the master cylinder pressure. This allows a proper braking force to foe imparted to the individual wheels (the front wheels 2L, 2R and the rear wheels 3L, 3R) of the vehicle via the corresponding wheel cylinders 4L, 4R, 5L, 5R.

Additionally, the second ECU 35 which controls the SSC 33 feeds the electric motor 48 based on the detection, signal from the depression amount detection sensor 8 which the second ECU 35 receives through the signal line 28 to thereby activate the hydraulic pumps 47, 47' to operate, selectively opening or closing the individual control valves 40, 40', 41, 41', 42, 42', 45, 45', 46, 46', 53, 53'. This can execute the braking force distributing control, the anti-look braking control, the vehicle stabilizing control, the hill start assisting control, the traction control, the vehicle following control, the lane departing avoidance control, the obstacle avoidance control and the like. In particular, in the anti-lock, braking control, when the slip amounts (or the slip ratios) of the wheels 2L, 2R, 3L, 3R which are detected by the slip amount detector 56 continue to exceed an anti-lock slip threshold for a predetermined period of time, the second ECU 35 selectively opens or closes the individual control valves 40, 40', 41, 41', 42, 42', 45, 45', 46, 46', 53, 53' to reduce, hold or increase the brake hydraulic pressures in the wheel cylinders 4L, 4R, 5L, 5R, whereby the slipping (locking) of the wheels 2L, 2R, 3L, 3R is restricted.

Incidentally, in the related art described in Japanese Patent Application Publication No. 2012-95391 described above, the relative slip ratio is calculated from the body speed and the wheel speeds so as to control the magnitude of regenerative braking according to the slip ratio so calculated. On the other hand, it is considered that a regenerative braking area is increased, that is, an increase gradient of the amount of regenerative braking is made steep in order to realize an extension in mileage based on electric power, for example, by increasing regenerative electric power based on regenerative braking. However, in case the increase gradient is made steep, a change rate of the amount of braking produced at the drive wheels becomes large, leading to fears that a time of excessive braking force condition in which the braking forces at the drive wheels are larger than the slip limit is extended. Namely, for example, in the configuration disclosed in Japanese Patent Application Publication No. 2012-95391, when the slip ratio exceeds a certain amount, even though the amount of regenerative braking is suppressed, the state in which the braking amount is excessive continues, leading to fears that the behavior of the vehicle becomes unstable.

In contrast with this, in the embodiment, when the front wheels 2L, 2R which constitute the drive wheels are detected as slipping as described above, the amount of regenerative braking is reduced so as to reduce the amount of braking applied on the drive wheels. As this occurs, the reduction amount of regenerative braking when the drive wheels are detected as slipping is set larger than the subsequent reduction amount of regenerative braking, whereby even when a slip occurs, the behavior of the vehicle can be maintained, stable.

Next, the regenerative control process (the regenerative slip restricting process) which is executed by the first ECO 27 will be described by the use of a flowchart shown in FIG. 3. The process shown in FIG. 3 is executed repeatedly at intervals of a predetermined controlling time by the first ECU 27 while the first ECU 27 is kept energized.

Figure 3:
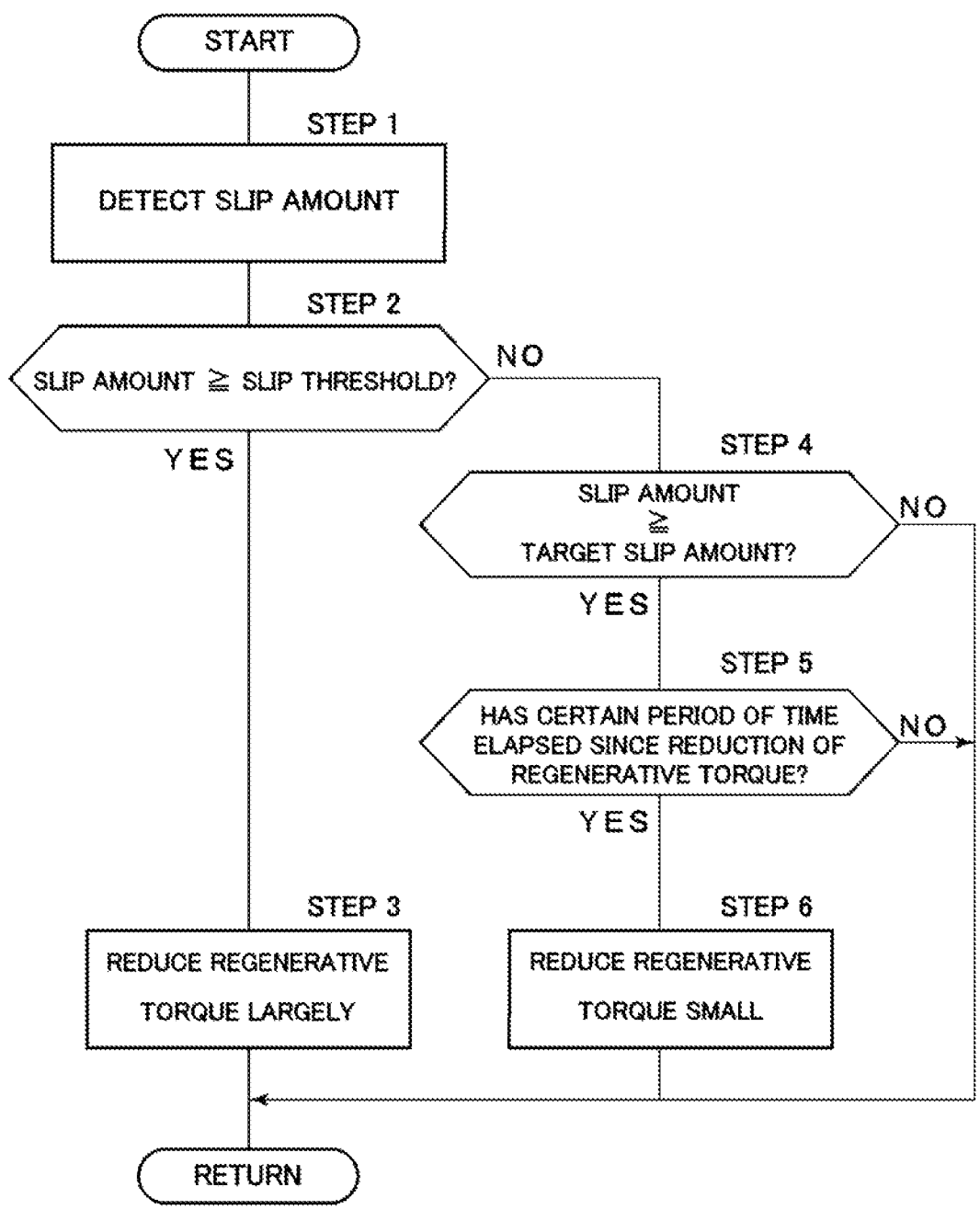
FIG. 3 is a flowchart showing a control process by the brake control system.

When the process shown in FIG. 3 starts as a result of the first ECU 27 starting to be energized (or the driver depressing the brake pedal 7 while driving the vehicle), in step 1, the first ECU 27 calculates a slip amount of the front wheels 2L, 2R which constitute the drive wheels. This slip amount is calculated based on the detection value of the slip amount detector 56. For example, in case the slip amount detector 56 is made up of the wheel, speed sensors which detect the rotational speeds of the wheels 2L, 2R, 3L, 3R, the slip amount of the front wheels 2L, 2R which constitute the drive wheels can be calculated based on a difference in rotational speed between the front wheels 2L, 2R which constitute the drive wheels and the rear wheels 3L, 3R which constitute the driven wheels. In addition, the slip amount can also be calculated based on a difference between the wheel speeds detected by the wheel speed sensors and the vehicle speed (the body speed, the vehicle speed) detected by the vehicle speed sensor.

In step 2 which follows step 1, it is determined whether or not the slip amount calculated in step 1 is equal to or larger than the slip threshold. Here, the slip threshold constitutes a determination value based on which whether or not the amount of braking applied on the drive wheels (the front wheels 2L, 2R) needs to be reduced (largely) is determined. The value of the slip threshold is set in advance based on experiments, calculations, simulations or the like so that the amount of regenerative braking can foe reduced so appropriately to maintain the behavior of the vehicle stable.

If "YES" in step 2, that is, if it is determined, in step 2 that the slip amount is equal to or larger than the slip threshold, the slip amount is large, and hence, it is highly possible that the behavior of the vehicle is deteriorated or that the anti-lock braking control is expected to intervene too early. In this case, the process proceeds to step 3, where the amount of regenerative braking (regenerative torque) of the drive wheels (the front wheels 2L, 2R) is reduced largely. This is because the amount of braking on the drive wheels needs to be made smaller than the slip limit amount as soon as possible since when determined, as "YES" in step 2, as the increase gradient of the amount of regenerative braking gets steeper, the amount of braking on the drive wheels becomes larger than the slip limit amount due to the regenerative cooperation is executed as shown in FIGS. 4 and 5.

Additionally, the difference between the slip limit amount and the amount of braking on the drive wheels becomes larger as the time until the detection of the slip amount becomes longer. In case the difference between the slip limit amount and the amount of braking on the drive wheels becomes large, the slip amount increases, and it is highly possible that the increase in slip amount leads to the deterioration of the behavior of the vehicle or the early intervention of the anti-lock braking control. Because of this, if it is determined that the slip amount is equal to or larger than the slip threshold, the amount of regenerative braking is reduced as much as possible, whereby the amount of braking on the drive wheels is made small as soon as possible so as to restrict the deterioration of the behavior of the vehicle or the early intervention of the anti-lock braking control. Because of this, the value of the extent by which the amount of regenerative braking is reduced in step 3, that is, the "large reduction in the amount of regenerative braking" or the first reduction amount is set in advance to, for example, such a value that can lower sufficiently the slip threshold by a single reduction based experiments, calculations, simulations or the like. In step 3, the amount of regenerative braking (regenerative torque) at the drive wheels (the front wheels 2L, 2R) is reduced largely, whereafter the process returns to the start via a step of return, and the operations from step 1 on are repeated.

On the other hand, if "PO" in step 2, that is, if it is determined in step 2 that the slip amount is smaller than the slip threshold, the slip amount is small, and it is considered that there is a low possibility that the slip amount leads to the deterioration of the behavior of the vehicle or the early intervention of the anti-lock braking control. However, although the slip amount is smaller than the slip threshold, it is possible that the slip amount is not sufficiently low. Additionally, for example, there is a possibility that although the amount of regenerative braking (regenerative torque) was reduced in step 3 or step 6 before the present control cycle, the slip amount has not yet been reduced sufficiently to reach a sufficiently low value.

Then, if it is determined "NO" in step 2, the process proceeds to step 4, where it is determined whether or not the slip amount is equal to or larger than a target slip amount which corresponds to a sufficiently low value (a target value). Here, the target slip amount is used as a value for determining whether or not the slip amount is a sufficiently low value is determined, more specifically, a value for determining whether or not the amount of braking applied on the drive wheels (the front wheels 2L, 2R) needs to be reduced by a small amount is determined. Thus, the slip amount is set in advance to such a value that can reduce the amount of regenerative braking as required so as to maintain the behavior of the vehicle stable based upon experiments, calculations, simulations or the like.

In case it is determined "NO" in step 4, that is, if it is determined in step 4 that the slip amount is smaller than the target slip amount, since the slip amount is sufficiently low (the slip amount is zero or small), the process returns to the start via the step of return without-involving operations in steps 5, 6, and the operations from step 1 on are repeated. Namely, in case it is determined "NO" in step 4, the operation to reduce the amount of regenerative braking (regenerative torque) is not executed (the normal regeneration cooperative control is continued).

On the other hand, if it is determined "YES" in step 4, that is, if it is determined in step 4 that the slip amount is equal to or larger than the target slip amount, the process proceeds to step 5, where it is determined whether or not a certain period of time has elapsed since the operation to reduce the amount of regenerative braking (regenerative torque) which was executed before the present control cycle. Namely, it is determined whether or not a certain period of time has elapsed since the amount of regenerative braking was last reduced. This ensures the intervals of a certain period, of time at which the amount of regenerative braking is reduced, whereby the amount of regenerative braking is held for the certain period of time.

This is because, although the amount of frictional braking which corresponds to the amount of regenerative braking needs to be produced momentarily by hydraulic pressure in the event that the amount of regenerative braking is reduced altogether at one time (i.e., the amount of regenerative braking is made zero) when reducing the amount of regenerative braking; there is a possibility that the amount of frictional braking which corresponds to the reduced amount of regenerative braking cannot be produced depending upon the response to the rise in hydraulic pressure in the master cylinder 3. This causes lack of braking force, leading to fears that the behavior of the vehicle is deteriorated or the deceleration is lost. Then, it is determined in step 5 whether or not the certain period of time has elapsed since the reduction in regenerative torque so that after the amount of regenerative braking is reduced, the reduced amount of regenerative braking can be held. The certain period of time is set in advance to such a value that can restrict the occurrence of lack of braking force (the deterioration of the behavior of the vehicle, the loss of deceleration) based on experiments, calculations, simulations or the like.

If it is determined "NO" in step 5, that is, it is determined in step 5 that the certain period of time has not elapsed since the previous reduction in the amount of regenerative braking (regenerative torque), the process returns to the start via the step of return without involving an operation in step 6 with the current amount of regenerative braking held, and the operations from, step 1 on are repeated. On the other hand, if it is determined "YES" in step 5, that is, if it is determined in step 5 that the certain period of time has elapsed since the previous reduction in the amount of regenerative braking (regenerative torque), the process proceeds to step 6.

In step 6, the amount of regenerative braking (regenerative torque) of the drive wheels (the front wheels 2L, 2R) is reduced by a smaller amount than the amount of reduction used in the operation in step 3, that is, a second reduction amount. The reason that the amount of regenerative braking is reduced small in this way is that as described above, in case the amount by which the amount of regenerative braking is reduced is large, there is caused lack of braking force depending upon the response to the rise in hydraulic pressure in the master cylinder 9, leading to fears that the deceleration is reduced. However, when the slip amount stays equal to or larger than the slip threshold, the amount of regenerative braking (regenerative torque) is reduced largely by the operation in step 3 so that the amount of braking on the drive wheels (the front wheels 2L, 2R) is made smaller than the slip limit amount as soon as possible. In contrast with this, in step 6, since the slip amount is smaller than, the slip threshold, the amount of regenerative braking (regenerative torque) is reduced small, so that the lack of braking force (the reduction in deceleration) caused in association with the response is restricted. Because of this, in step 6, the value of the extent by which the amount of regenerative braking is reduced, that is, the "small reduction in the amount of regenerative braking" is set in advance to, for example, such a value that can restrict, the lack of braking force (the reduction in deceleration) associated with the response based on experiments, calculations, simulations or the like. In case the amount of regenerative braking (regenerative torque) of the drive wheels (the front wheels 21, 2R) is reduced small, in step 6, the process returns to the start via the step of return, and the operations from step 1 on are repeated.

Thus, in case the amount of braking on the drive wheels (the front wheels 2L, 2R) becomes larger than the slip limit amount when the regeneration cooperative control is executed by the driver depressing the brake pedal 7 while he or she is driving the vehicle, the first ECU 27 transmits the required amount of regenerative braking which is reduced based on the operation in step 3 in FIG. 3 to the third ECU 54 by way of the vehicle data bus 29. By doing so, since the required amount of regenerative braking so received is smaller than the amount of regenerative braking which is actually executed, the third ECU 54 reduces the amount of regenerative braking at the drive wheels and transmits the reduced amount of regenerative braking (the amount of regenerative braking which is actually executed) to the first ECU 27 by way of the vehicle data bus 29.

The first ECU 27 produces a difference between the received amount of regenerate braking which is actually executed and a total amount of braking which is to be produced toy the driver depressing the brake pedal 7, as an amount of friction braking required at the friction brake units 6, by changing the electric motor 22 of the electric booster unit 17 to increase the hydraulic pressure in the master cylinder 9. As a result of this, even in case the wheels slip due to the amount of braking on the drive wheels being large when the regeneration cooperative control is being executed by the driver depressing the brake pedal 7 while he or she is driving the vehicle, an appropriate exchange of amounts of braking (the amount of regenerative braking is reduced, and the amount of frictional braking is increased by the amount corresponding to the reduced amount of regenerative braking) can be executed. This can restrict the deterioration of the behavior of the vehicle or the early activation of the anti-lock braking control.

Thus, as has been described heretofore, in this embodiment, the behavior of the vehicle can be maintained stable when a slip is generated. Namely, when the operation in step 2 detects that the wheels slip, the ECO 27 reduces the amount of regenerative braking by the operation in step 3. As this occurs, the amount of regenerative braking which is reduced by the operation in step 3 is set larger than the predetermined reduction amount by which the subsequent regenerative braking is reduced, that is, the predetermined reduction amount by which the regenerative braking is reduced by the operation in step 6. This setting can make large the predetermined reduction amount in the initial (first) regenerative braking executed when the slip occurs, thereby making it possible to restrict the continuation of the state in which the amount of braking is excessive (to shorten the time when the state continues in which the amount of braking is excessive). As a result of this, it is possible to maintain the behavior of the vehicle stable when the wheels slip.

FIGS. 3 and 5 show changes with time in the amount of braking applied on the drive wheels and the amount of slip of the drive wheels. Of these figures, FIG. 4 shows an example in which the operation in step 6 to reduce the amount of regenerative braking is repeated, three times after the operation in step 3 to reduce the amount of regenerative braking is executed. In this case, the amount of braking applied on the drive wheels is lowered below the slip limit amount by the operation in step 3 to reduce the amount of regenerative braking, and thereafter, the operation in step 6 to reduce the amount of regenerative braking is repeated three times until the slip amount of the drive wheels is lowered below the target slip amount. On the other hand, FIG. 5 shows an example in which the operation in step 6 to reduce the amount of regenerative braking is executed once after the operation in step 3 to reduce the amount of regenerative braking is executed. In this case, the operation in step 6 to reduce the amount of regenerative braking is executed once after the operation in step 3 to reduce the amount of regenerative braking is executed, whereby the slip amount of the drive wheels is lowered below the target slip amount. In either of the cases, it is possible to restrict the continuation of the state in which the amount of braking is excessive (the state in which the amount of braking is equal to or exceeds the slip limit amount), thereby making it possible to maintain the behavior of the vehicle stable when the wheels slip.

In the embodiment described heretofore, the operations in steps 2, 3, 5 and 6 in FIG. 3 show specific examples of the regenerative slip control unit which constitutes one of the constituent features of the invention.

Figure 6:
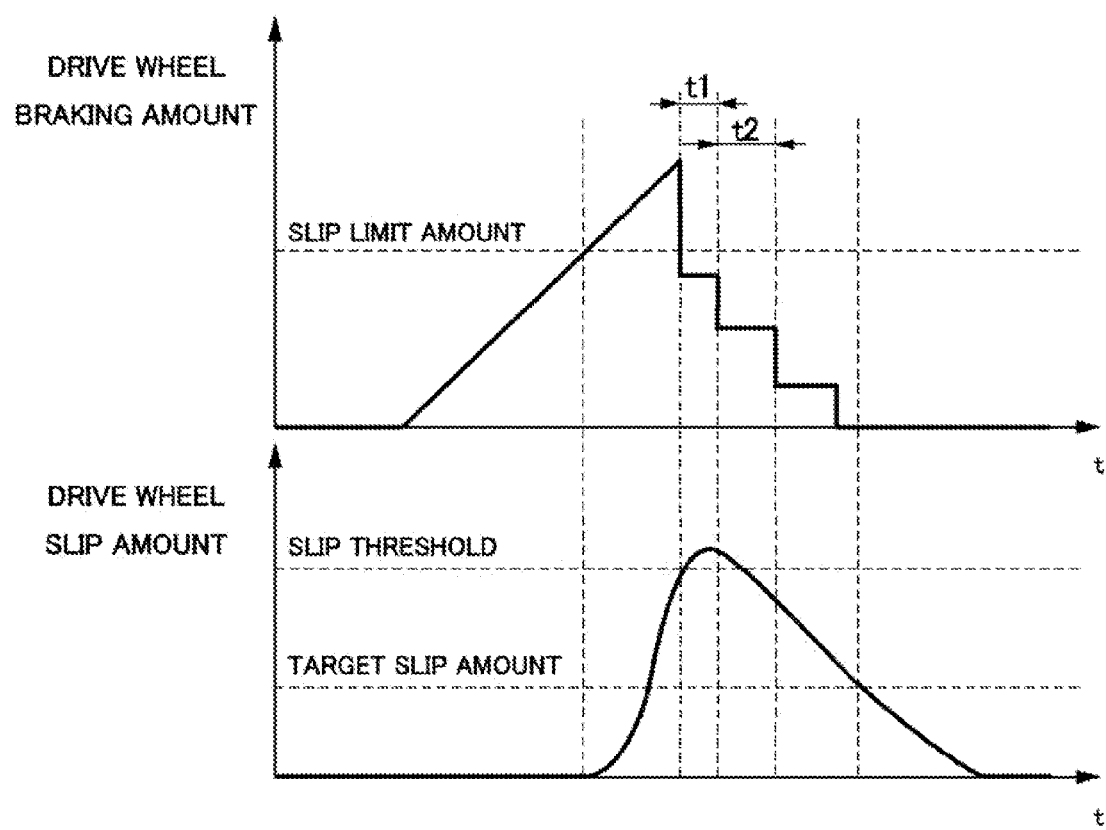
FIG. 6 is a characteristic curve chart showing an example of a change with time in drive wheel braking amount and drive wheel slip amount according to a first modified example.

In the embodiment described above, the intervals at which the amount of regenerative braking is reduced (the intervals at which, the slip restricting control is executed) are described as being constant. However, the invention is not limited thereto, and hence, as with a first modified example shown in FIG. 6, intervals t1, t2 at which the slip restricting control is executed (the amount of regenerative braking is reduced) may be varied (t1<t2). As this occurs, as the time which elapses since the occurrence of slip becomes shorter, the intervals at which the slip restricting control is executed are made small, that is, t1<t2, whereby the (total) reduction amount of regenerative braking in the initial stage of occurrence of slip can be made large. To describe this in the other way round, the intervals at which, the slip restricting control is executed can be extended every time he slip restricting control is repeated. In this respect, too, it is possible to maintain the behavior of the vehicle stable when the wheels slip.

Figure 7:
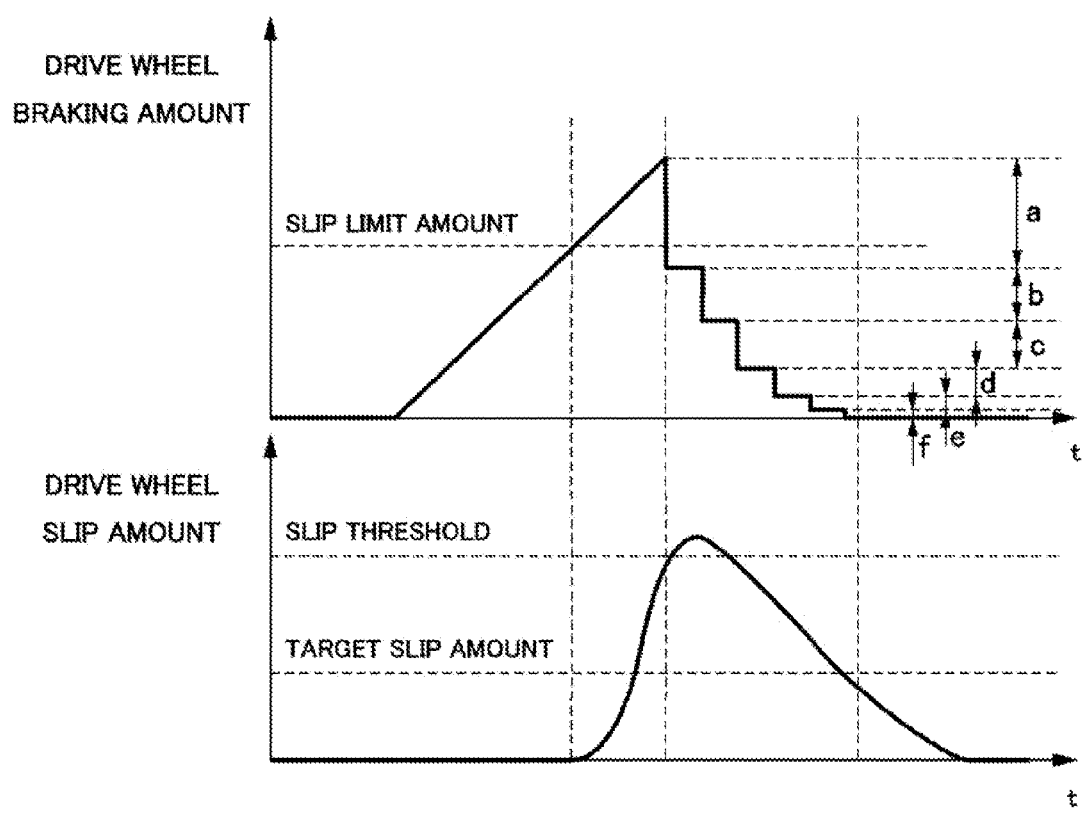
FIG. 7 is a characteristic curve chart showing an example of a change with time in drive wheel braking amount and drive wheel slip amount according to a second modified example.

In the embodiment described above, the predetermined reduction amount by which the amount of regenerative braking is reduced is described as being constant (the predetermined reduction amount in step 6 is constant). However, the invention is not limited thereto. For example, as shown in a second modified example shown in FIG. 7, predetermined reduction amounts a, b, c, d, e, f may be reduced (a>b>c>d>e>f) every time the slip restricting control is repeated. In this case, it is possible to make large the reduction amount in the initial regenerative braking when, the wheels slip, and it is also possible to restrict the predetermined reduction amount in the subsequent regenerative braking from becoming too large. This makes maintaining the behavior of the vehicle stable compatible with ensuring regenerative power. The second modified example may be carried out in combination with the first modified example.

In the embodiment described above, the control process shown in FIG. 3 is described as being executed by the first ECU 27. However, the invention is not limited thereto. For example, a configuration may be adopted in which the control process shown, in FIG. 3 is executed, by the third ECU 54 or the second ECU 35. Additionally, the control process may be executed by anyone of the other ECUs disposed in the vehicle.

In the embodiment described above, the slip amount detector 56 which is the slip amount detecting unit is described as being connected to the second ECU 35. However, the invention is not limited thereto, and hence, a configuration may be adopted in which the slip amount detector 56 is connected to, for example, the first ECO 27 or the third ECU 54. The slip amount detector 56 may be connected, to anyone of the other ECUs disposed in the vehicle.

In the embodiment described above, the front wheels 22, 2R are described, as being driven, by the motor-generator 55 which is the traction, (drive) motor. Namely, the drive wheels are described as being the front wheels 2L, 2R. However, the invention is not limited thereto. For example, the motor-generator (the electric motor) may drive the rear wheels (the drive wheels are the rear wheels). Alternatively, the motor-generator may drive both the front wheels and the rear wheels (the drive wheels are the front and rear wheels).

According to the embodiment described heretofore, the behavior of the vehicle can be maintained stable when the wheels slip.

Namely, the regenerative slip control unit sets the predetermined reduction amount of regenerative braking when the wheels slip larger than the predetermined reduction amount of regenerative braking in the subsequent slip restricting control. This setting can make large the initial (first) predetermined reduction amount of regenerative braking when the wheels slip, thereby making it possible to restrict the continuation of the state in which the amount of braking is excessive (to shorten the time when the amount of braking is excessive). As a result of this, the behavior of the vehicle can be maintained stable when the wheels slip.

According to the embodiment (the first modified example), the regenerative slip control unit varies the intervals at which the slip restricting control is executed. In this case, the intervals at which the slip restricting control is executed is made small (the intervals at which the slip restricting control is executed is extended every time the slip restricting control is repeated) as the time which elapses since the occurrence of slip becomes short, whereby the (total) reduction amount of regenerative braking in the initial stage of occurrence of slip can be made large. In this respect, too, this can maintain stable the behavior of the vehicle when the wheels slip.

According to the embodiment (the second modified example), the regenerative slip control unit reduces the predetermined reduction amount every time the slip restricting control is repeated. In this case, it is possible to restrict the reduction amount of regenerative braking in the initial stage of occurrence of slip from being increased and the predetermined reduction amount of regenerative braking from being increased excessively thereafter. This can make maintaining the behavior of the vehicle stable compatible with ensuring the regenerative power.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority to Japanese Patent Applications No. 2014-017779 filed on Jan. 31, 2014. The entire disclosures of No. 2014-017773 filed on Mar. 31, 2014 including specification, claims, drawings and summary are incorporated herein by reference in its entirety.

What is claimed is:

1. A brake control system driven by an electric motor and configured to brake a vehicle by not only controlling an amount of regenerative braking by the electric motor but also controlling friction braking devices which are provided individually at wheels and which each have a friction lining which moves upon receipt of a hydraulic pressure, the brake control system comprising:
   a slip amount detection unit configured to detect an amount of slip of each of the wheels which are provided on the vehicle; and
   a regenerative slip control unit configured to determine that the wheels are slipping when a detection value of the slip amount detection unit exceeds a slip threshold during a regenerative braking by the electric motor, and execute repeatedly a slip restricting control in which an amount of regenerative braking is reduced by a predetermined amount and thereafter, the resulting reduced amount of regenerative braking is held for a predetermined period of time,
   wherein the slip restricting control unit sets the predetermined reduction amount by which the amount of regenerative braking is reduced when the wheels are detected as slipping larger than a predetermined reduction amount by which the amount of regenerative braking is reduced in the slip restricting control which is executed subsequently.

2. The brake control system according to claim 1, wherein the regenerative slip control unit varies intervals at which the slip restricting control is executed.

3. The brake control system according to claim 2, wherein the regenerative slip control unit reduces the predetermined reduction amount every time the slip restricting control is repeated.

4. The brake control system according to claim 1, wherein the regenerative slip control unit extends the intervals at which the slip restricting control is executed every time the slip restricting control is repeated.

5. The brake control system according to claim 4, wherein the regenerative slip control unit reduces the predetermined reduction amount every time the slip restricting control is repeated.

6. The brake control system according to claim 1, wherein the regenerative slip control unit reduces the predetermined reduction amount every time the slip restricting control is repeated.

7. The brake control system according to claim 1, wherein the predetermined reduction amount of regenerative braking when the wheels are detected as slipping is a reduction amount by which the amount of regenerative braking is initially reduced.

8. The brake control system according to claim 1, wherein the predetermined reduction amount of regenerative braking when the wheels are detected as slipping is a reduction amount which produces an amount of regenerative braking which is smaller than an amount of regenerative braking which corresponds to a slip threshold based on which the wheels are detected as slipping.

9. The brake control system according to claim 1, wherein the regenerative slip control unit is provided in a controller which controls the friction brake units.

10. The brake control system according to claim 1, wherein the regenerative slip control unit is provided in a controller which controls the amount of regenerative braking of the electric motor.

11. A brake control system driven by an electric motor and configured to brake a vehicle by controlling an amount of regenerative braking by the electric motor, the brake control system comprising:
a slip amount detection unit configured to detect an amount of slip of each of the wheels which are provided on the vehicle; and
a regenerative slip control unit configured to determine that the wheels are slipping when a detection value of the slip amount detection unit exceeds a slip threshold during a regenerative braking by the electric motor, and execute repeatedly a slip restricting control in which an amount of regenerative braking is reduced by a predetermined amount and thereafter, the resulting reduced amount of regenerative braking is held for a predetermined period of time,
wherein the slip restricting control unit has set therein a first reduction amount which is an initial reduction amount by which the amount of regenerative braking is reduced initially when the wheels are detected as slipping and a second reduction amount which is smaller than the first reduction amount and by which the amount of regenerative braking is reduced after holding the reduced amount of regenerative braking for the predetermined period of time.

12. The brake control system according to claim 11, wherein the regenerative slip control unit varies intervals at which the slip restricting control is executed.

13. The brake control system according to claim 11, wherein the regenerative slip control unit extends the intervals at which the slip restricting control is executed every time the slip restricting control is repeated.

14. The brake control system according to claim 11, wherein the regenerative slip control unit reduces the second reduction amount every time the slip restricting control is repeated.

15. The brake control system according to claim 11, wherein the first reduction amount is a reduction amount which produces an amount of regenerative braking which is smaller than an amount of regenerative braking which corresponds to a slip threshold based on which the wheels are detected as slipping.

16. The brake control system according to claim 11, wherein the regenerative slip control unit is provided in a controller which controls the friction brake units.

17. The brake control system according to claim 11, wherein the regenerative slip control unit is provided in a controller which controls the amount of regenerative braking of the electric motor.

18. A brake control system having a regenerative controller which is driven by an electric motor and which controls the amount of regenerative braking by the electric motor, a frictional braking controller which controls, in cooperation with the regenerative controller, friction brake units which are provided individually at wheels fitted on a vehicle and which each have a frictional lining which moves upon receipt of a hydraulic pressure, and a slip amount detector which detects an amount of slip of the wheels fitted on the vehicle, the frictional braking controller and the regenerative braking controller cooperating with each other to brake the vehicle,
wherein the frictional braking controller has a regenerative slip control unit configured to determine that the wheels are slipping when a detection value of the slip amount detection unit exceeds a slip threshold during a regenerative braking by the electric motor, and execute repeatedly a slip restricting control in which an amount of regenerative braking is reduced by a predetermined amount and thereafter, the resulting reduced amount of regenerative braking is held for a predetermined period of time, and
wherein the slip restricting control unit has set therein a first reduction amount which is an initial reduction amount by which the amount of regenerative braking is reduced initially when the wheels are detected as slipping and a second reduction amount which is smaller than the first reduction amount and by which the amount of regenerative braking is reduced after holding the reduced amount of regenerative braking for the predetermined period of time.

19. The brake control system according to claim 18, wherein the regenerative slip control unit reduces the second reduction amount every time the slip restricting control is repeated.

20. The brake control system according to claim 18, wherein the first reduction amount is a reduction amount which produces an amount of regenerative braking which is smaller than an amount of regenerative braking which corresponds to a slip threshold based on which the wheels are detected as slipping.

* * * * *